United States Patent
Asplund

(10) Patent No.: US 7,905,526 B2
(45) Date of Patent: Mar. 15, 2011

(54) BUMPER BEAM

(75) Inventor: Mattias Asplund, Boden (SE)

(73) Assignee: Gestamp Hardtech AB, Lulea (SE)

( * ) Notice: Subject to any disclaimer, the term of this patent is extended or adjusted under 35 U.S.C. 154(b) by 0 days.

(21) Appl. No.: 12/227,089

(22) PCT Filed: May 16, 2007

(86) PCT No.: PCT/SE2007/000493
§ 371 (c)(1),
(2), (4) Date: Nov. 5, 2008

(87) PCT Pub. No.: WO2007/136331
PCT Pub. Date: Nov. 29, 2007

(65) Prior Publication Data
US 2009/0096223 A1    Apr. 16, 2009

(30) Foreign Application Priority Data

May 18, 2006   (SE) ...................................... 0601107
Nov. 30, 2006   (SE) ...................................... 0602552

(51) Int. Cl.
*B60R 19/02*    (2006.01)
(52) U.S. Cl. ................... 293/102; 293/120; 296/187.09; 296/187.11
(58) Field of Classification Search .................. 293/120, 293/102, 121, 143, 122; 296/187.09, 187.11; *B60R 19/02*
See application file for complete search history.

(56) References Cited

U.S. PATENT DOCUMENTS

| | | | | | |
|---|---|---|---|---|---|
| 2,329,874 | A | * | 9/1943 | Cadwallader et al. | 293/115 |
| 2,829,915 | A | * | 4/1958 | Claveau | 293/109 |
| 3,843,182 | A | * | 10/1974 | Walls et al. | 293/122 |
| 3,884,516 | A | * | 5/1975 | Gallion et al. | 293/120 |
| 3,926,462 | A | * | 12/1975 | Burns et al. | 293/136 |
| 4,050,726 | A | * | 9/1977 | Hablitzel | 293/122 |
| 4,073,528 | A | * | 2/1978 | Klie | 293/122 |
| 4,186,915 | A | * | 2/1980 | Zeller et al. | 267/140 |
| 4,350,378 | A | * | 9/1982 | Wakamatsu | 293/120 |
| 4,361,352 | A | * | 11/1982 | Wakamatsu | 293/120 |
| 4,397,490 | A | * | 8/1983 | Evans et al. | 293/120 |
| 4,968,076 | A | * | 11/1990 | Kuroki | 293/121 |
| 6,540,275 | B1 | * | 4/2003 | Iwamoto et al. | 293/24 |
| 6,644,726 | B2 | * | 11/2003 | Fujii et al. | 296/203.04 |
| 6,971,692 | B2 | * | 12/2005 | Gioia et al. | 293/120 |
| 7,165,794 | B2 | * | 1/2007 | Banry et al. | 293/133 |
| 7,316,432 | B2 | * | 1/2008 | Muskos | 293/102 |
| 7,357,430 | B2 | * | 4/2008 | Karlander | 293/102 |
| 7,357,432 | B2 | * | 4/2008 | Roll et al. | 293/133 |
| 7,413,226 | B2 | * | 8/2008 | Muskos | 293/133 |

(Continued)

FOREIGN PATENT DOCUMENTS

FR    2862262    5/2005

(Continued)

*Primary Examiner* — Glenn Dayoan
*Assistant Examiner* — Pinel E Romain
(74) *Attorney, Agent, or Firm* — Mark P. Stone

(57) ABSTRACT

A bumper beam (10) e.g. for an SUV, has its flange portions (18, 19) positioned high and extends asymmetrically downwards relative to them. It has an outwardly convex profile which has in its lower portion a longitudinal concavity (16) which, near to the lower edge of the profile, ends with a forward-pointing profile portion (21). The result is less risk that the bumper will climb up over a lower-positioned bumper (30) which it collides with.

3 Claims, 3 Drawing Sheets

U.S. PATENT DOCUMENTS

| | | | | |
|---|---|---|---|---|
| 2001/0026073 | A1* | 10/2001 | Sato et al. | 293/121 |
| 2007/0102942 | A1* | 5/2007 | Muskos | 293/102 |
| 2007/0176438 | A1* | 8/2007 | Tornberg | 293/102 |
| 2007/0257497 | A1* | 11/2007 | Heatherington et al. | 293/120 |
| 2009/0115205 | A1* | 5/2009 | Steller et al. | 293/115 |

FOREIGN PATENT DOCUMENTS

| | | | |
|---|---|---|---|
| JP | 06247237 | A * | 9/1994 |
| JP | 2004262300 | | 9/2004 |
| SE | 527530 | | 4/2006 |
| SE | 527530 | C2 * | 4/2006 |

* cited by examiner

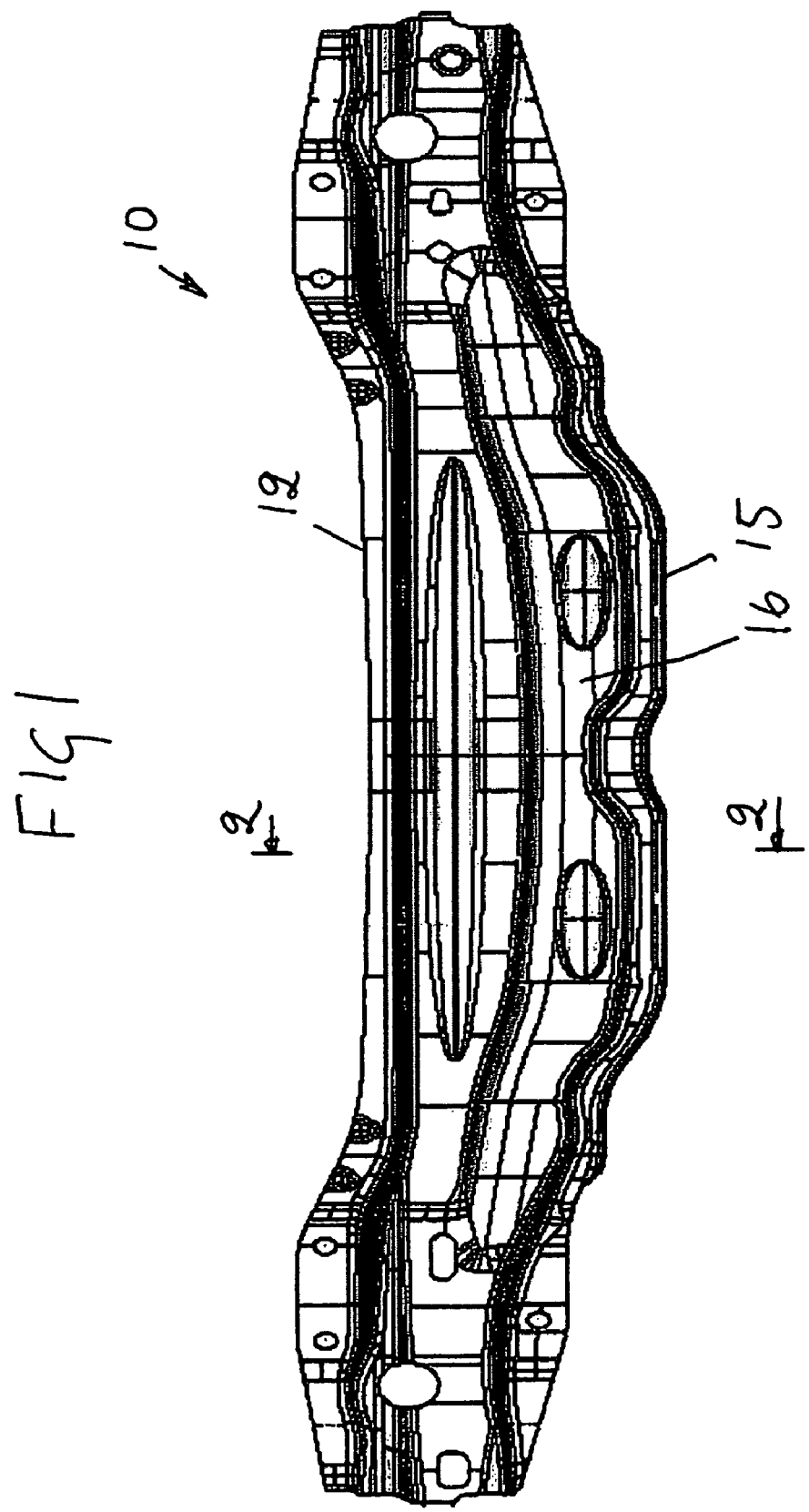

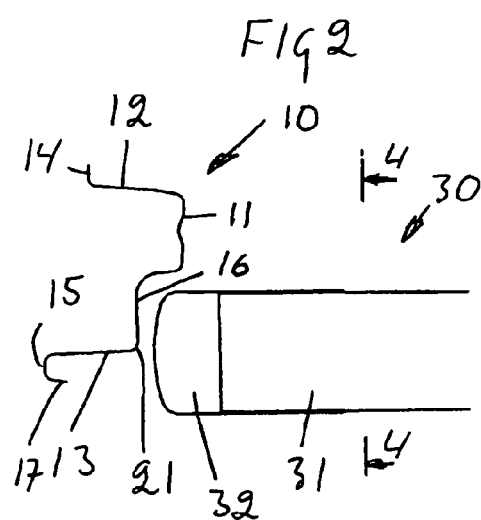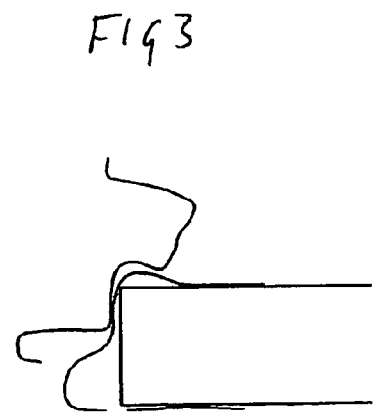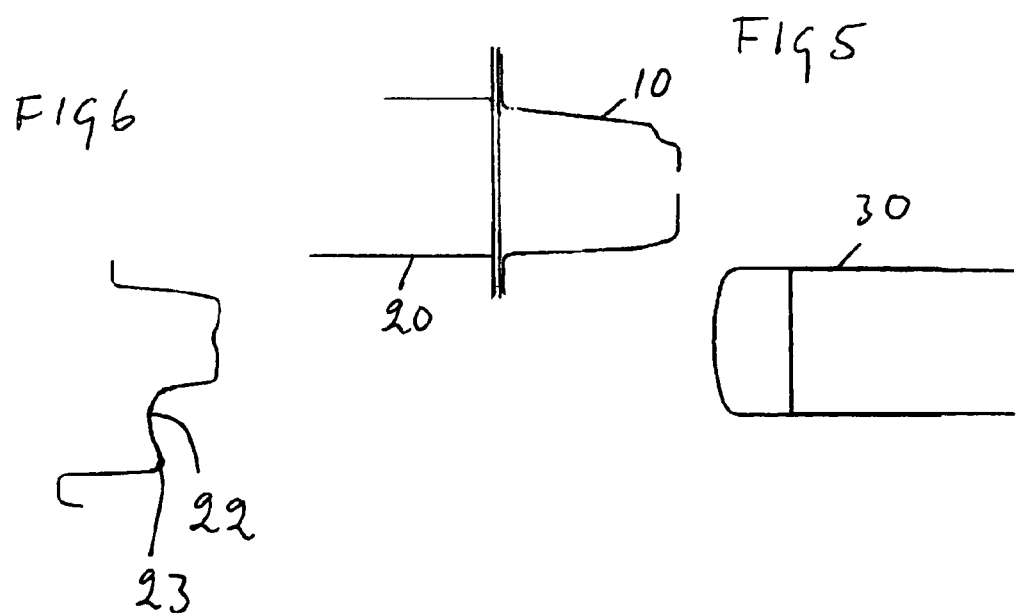

BUMPER BEAM

TECHNICAL FIELD

The present invention relates to a bumper beam for vehicles which extends asymmetrically downwards relative to its attachment surfaces.

BACKGROUND TO THE INVENTION

High vehicles, e.g. SUVs, often have their bumper beam higher than that of an ordinary passenger car. In a collision between two vehicles which have bumper beams at different heights, the two bumper beams tend to slide on one another, with the result that one vehicle slips under the other and the bumper beams in such a collision do not function in the intended manner to absorb energy by deformation.

As illustrated by FIG. 1 of the drawing, the bumper beam 10 is generally bow-shaped and extends downwardly from attachment surfaces at the ends of the bumper beam towards the longitudinal center of the bumper beam.

OBJECT AND BRIEF DESCRIPTION OF THE INVENTION

It is an object of the invention to provide a bumper beam which has less risk of slipping over or under the bumper beam of a colliding vehicle.

This is achieved by the bumper beam having an outwardly convex profile which has in its lower portion a longitudinal concavity which, close to the lower edge of the profile, ends with a profile portion pointing forwards. The result is that in a collision the two bumper beams tend to lock securely together during their deformation. The invention is defined by the claims.

The invention may with advantage be applied to a bumper beam with a hat profile.

BRIEF DESCRIPTION OF THE DRAWINGS ILLUSTRATING AN EXAMPLE OF THE INVENTION

FIG. 1 is a view of a bumper beam as seen from the outside.

FIG. 2 is a cross-section along the line 2-2 in FIG. 1 and also depicts in section a dummy bumper for collision tests.

Figure 4:
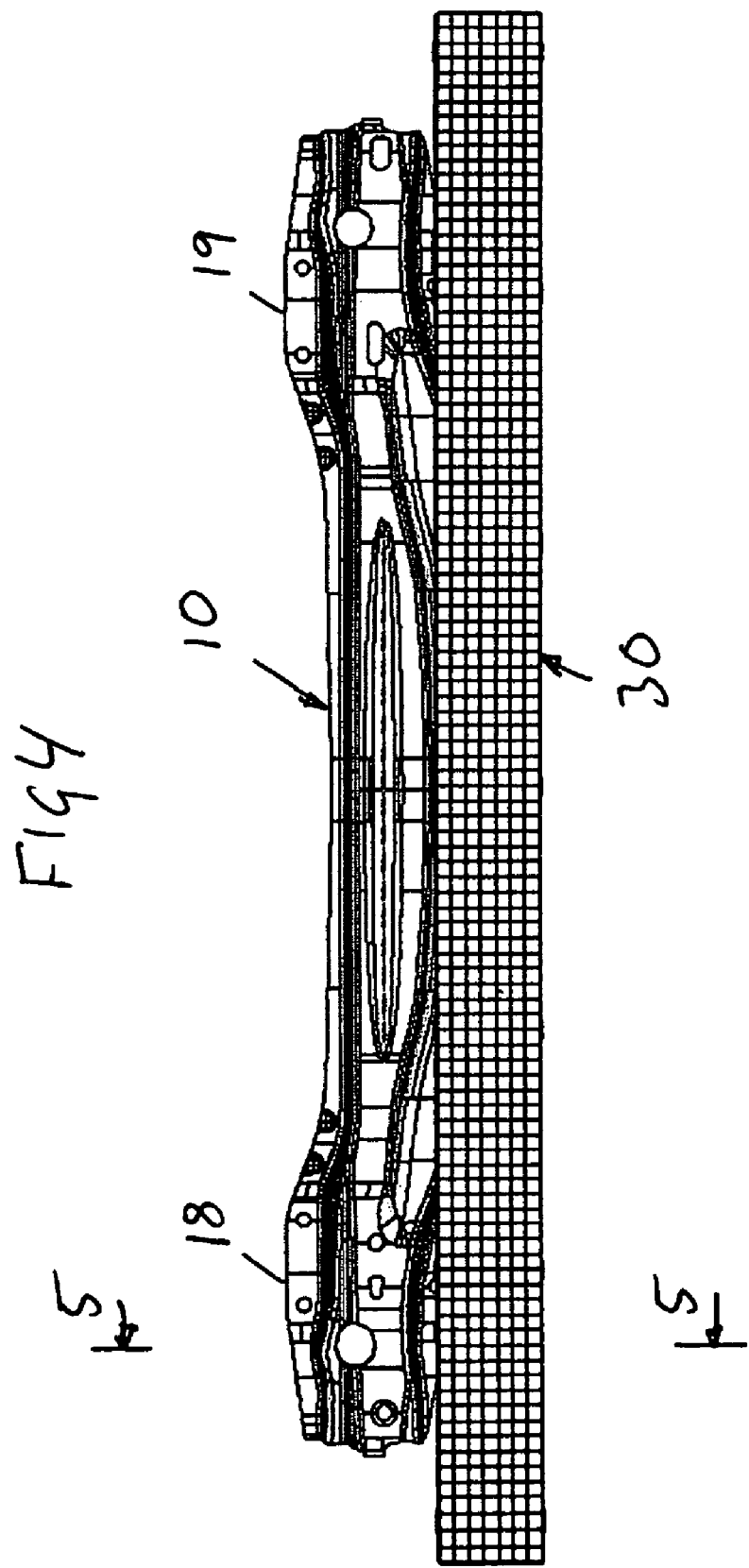

FIG. 3 corresponds to FIG. 2 but depicts the bumper beam and the dummy bumper during deformation in a collision test.

FIG. 4 is a view like FIG. 1 but taken along the line 4-4 in FIG. 2 and showing the dummy bumper depicted in FIG. 2.

FIG. 5 is a section through the bumper beam's attachment, taken along the line 5-5 in FIG. 4.

FIG. 6 corresponds to FIG. 2 but depicts a modified bumper beam.

BRIEF DESCRIPTION OF THE ILLUSTRATED EMBODIMENT OF THE INVENTION

The bumper beam depicted in the drawings is made of metal. It may with advantage be made of hardenable sheet steel which is hot-formed and hardened in one step in the so-called press-hardening process. The steel is of high strength and may have a yield point of over 900 MPa (N/mm$^2$), e.g. over 1100 or over 1200 MPa.

The bumper beam 10 is a hat-shaped beam (it has a hat profile) with a central flange 11, two webs 12, 13 and two side flanges 14, 15, and it has an open cross-section as best illustrated in FIG. 2. The webs and the central flange form the hat-shaped beam's crown pointing outwards from the vehicle, i.e. the profile is convex outwards. The example depicted is of a front bumper beam, but the invention may also be applied to a rear bumper beam.

FIGS. 2 and 4 also depict a dummy bumper beam 30 comprising an iron core 31 and a plastic foam element 32 which has a plastic sheath of deformable plastic. It is fixed and a collision test involves a carriage on which the bumper beam is mounted being accelerated against the dummy bumper beam. The bumper beam is spring-loaded to its vertical position to correspond to reality, but may be moved upwards or downwards by vertical collision forces.

One side of the central flange 11, the lower portion of the central flange, has a step 16 forming a vertical surface which has a negative slope, i.e. it slopes somewhat forwards. This slope may with advantage be 1-5 degrees to the vertical. This step forms a longitudinal concavity and its forward edge 21 forms, due to the slope of the step 16, a profile portion pointing forwards. The lower side flange has stiffening in the form of an edge 17 bent forwards. The bumper beam has boltholes in its two attachment portions 18, 19 for fastening to a load-bearing portion of the vehicle, usually to the vehicle's side rails or to crash boxes 20 (FIG. 5) fastened to the side rails. With advantage, the crash boxes have end plates to which the bumper beam is bolted. The bumper beam depicted is intended for a vehicle with side rails positioned higher than those of ordinary passenger cars. The middle portion of its central flange is therefore asymmetrically broader downwards so that this lower portion will match with a colliding vehicle's bumper beam positioned lower, as illustrated in FIG. 4 where the dummy bumper 30 corresponds to such a lower-positioned bumper. FIG. 6 depicts a modified version of the bumper beam with a longitudinal concavity 22 corresponding to the surface 16 in FIG. 2 and forming a forward-pointing edge or profile portion 23 corresponding to the edge 17 in FIG. 2.

In such a collision between two bumpers at different heights, the higher-positioned bumper tends to climb up over the lower-positioned bumper, with the result that the bumpers do not deform as intended in order to absorb collision energy. The fact that the step or plane 16 is not entirely vertical but slopes somewhat forwards tends to cause it to hold the two bumpers together vertically, and a collision test with the bumper 10 and the dummy bumper 30 as illustrated resulted in a deformation situation according to FIG. 3. In a corresponding test with a bumper beam which had a fully vertical step 16, the bumper beam slid directly upwards over the dummy bumper beam.

The invention is here exemplified with a high-positioned front bumper beam but is also applicable to rear bumpers. It should be noted that the bumper beam depicted is merely an example of the invention and that the invention is applicable to other designs of bumper beam. It may be applied to bumper beams which do not have a hat profile.

The invention claimed is:

1. A bumper beam for vehicles which extends asymmetrically downwards between attachment surfaces thereof disposed at the ends of the beam, said bumper beam defining a generally bow-shaped configuration extending downwardly from said attachment surfaces towards the longitudinal center of the bumper beam, said bumper beam having a top and a bottom surface, wherein said bumper beam has an outwardly convex profile having a crown portion pointing outwardly from the vehicle, said outwardly convex profile having in a lower portion thereof a longitudinal concavity (16, 22) which, near to the lower edge of the profile, ends with a forward-pointing profile portion (21, 23), said longitudinal concavity having a surface (16) continuously sloping forwards with a front edge (21) thereof forming said forward-pointing profile portion, said forwardmost portion of said front edge merging with the bottom surface of said bumper beam, wherein said bumper is arranged to reduce or prevent said bumper beam from riding over a lower elevated bumper beam of another vehicle in a collision so that said bumper beam and said lower elevated bumper beam are securely engaged during a collision to permit deformation and energy absorption by said bumper beam and said lower elevated bumper beam during a collision.

2. A bumper beam according to claim 1, characterised in that said bumper beam has a central flange (11), said top and bottom surfaces of said bumper beam defining two webs (12,13) extending from said central flange, and side flanges (14, 15) extending from said webs, the central flange being asymmetrically broader in a middle portion thereof than at fastening portions thereof and having said sloping surface (16) on the broadest side.

3. A bumper beam according to claim 2, characterised in that the side flange (15) nearest to said sloping surface has a bent edge (17).

* * * * *

UNITED STATES PATENT AND TRADEMARK OFFICE
CERTIFICATE OF CORRECTION

| | | |
|---|---|---|
| PATENT NO. | : 7,905,526 B2 | |
| APPLICATION NO. | : 12/227089 | |
| DATED | : March 15, 2011 | |
| INVENTOR(S) | : Mattias Asplund | |

It is certified that error appears in the above-identified patent and that said Letters Patent is hereby corrected as shown below:

Column 2, below Line 4: Add the following paragraph:

-- As illustrated by Figure 1 of the drawing, the bumper beam 10 is generally bow-shaped and extends downwardly from attachment surfaces at the ends of the bumper beam towards the longitudinal center of the bumper beam. --

Signed and Sealed this
Third Day of May, 2011

David J. Kappos
*Director of the United States Patent and Trademark Office*